(12) United States Patent
Ludwig et al.

(10) Patent No.: US 7,180,579 B1
(45) Date of Patent: Feb. 20, 2007

(54) THREE-DIMENSIONAL IMAGING PROCESSING MODULE INCORPORATING STACKED LAYERS CONTAINING MICROELECTRONIC CIRCUITS

(75) Inventors: David E. Ludwig, Irvine, CA (US); John V. Kennedy, Irvine, CA (US); William Kleinhans, Westlake Village, CA (US); Tina Liu, Westlake Village, CA (US); Christian Krutzik, Costa Mesa, CA (US)

(73) Assignee: Irvine Sensors Corp., Costa Mesa, CA (US)

( * ) Notice: Subject to any disclaimer, the term of this patent is extended or adjusted under 35 U.S.C. 154(b) by 152 days.

(21) Appl. No.: 10/806,037

(22) Filed: Mar. 22, 2004

Related U.S. Application Data

(60) Provisional application No. 60/462,677, filed on Mar. 28, 2003.

(51) Int. Cl.
  *G01C 3/08* (2006.01)
(52) U.S. Cl. .................. 356/4.01; 356/5.01; 356/5.02; 356/4.02
(58) Field of Classification Search ................ 356/4.01
  See application file for complete search history.

(56) References Cited

U.S. PATENT DOCUMENTS

| | | | | |
|---|---|---|---|---|
| 644,968 A | * | 3/1900 | Burt | ............................ 301/58 |
| 4,659,931 A | * | 4/1987 | Schmitz et al. | .......... 250/338.4 |
| 5,214,274 A | * | 5/1993 | Yang | ........................ 250/208.1 |
| 5,262,837 A | * | 11/1993 | Shyy | .......................... 356/5.01 |
| 5,682,229 A | * | 10/1997 | Wangler | .................... 356/4.01 |
| 5,875,158 A | * | 2/1999 | Schell | ...................... 369/44.34 |
| 5,953,110 A | * | 9/1999 | Burns | ........................ 356/5.01 |

FOREIGN PATENT DOCUMENTS

JP                11-355813              12/1999

\* cited by examiner

*Primary Examiner*—Thomas H. Tarcza
*Assistant Examiner*—Luke D. Ratcliffe
(74) *Attorney, Agent, or Firm*—W. Eric Boyd; McDermott, Will & Emery

(57) ABSTRACT

A 3-D LADAR imaging system incorporating stacked microelectronic layers is provided. A light source is imaged upon a target through beam shaping optics. Photons reflected from the target are collected and imaged upon a detector array though collection optics. The detector array signals are fed into a multilayer processing module wherein each layer includes detector signal processing circuitry. The detector array signals are amplified, compared to a user-defined threshold, digitized and fed into a high speed FIFO range bin. Dependant on the value of the digit contained in the bins in the register, and the digit's bin location, the time of a photon reflection from a target surface can be determined. A $T_0$ trigger signal defines the reflection time represented by each bin location by resetting appropriate circuitry to begin processing. The bin data representing the photon reflections from the various target surfaces are read out of the FIFO and processed using appropriate circuitry to create a 3-D point cloud for creating a 3-D target image.

12 Claims, 4 Drawing Sheets

THREE-DIMENSIONAL IMAGING PROCESSING MODULE INCORPORATING STACKED LAYERS CONTAINING MICROELECTRONIC CIRCUITS

CROSS REFERENCE TO RELATED APPLICATIONS

This application is related to U.S. Provisional patent application Ser. No. 60/462,677, filed on Mar. 28, 2003, which is incorporated herein by reference and to which priority is claimed pursuant to 35 USC 119.

STATEMENT REGARDING FEDERALLY SPONSORED RESEARCH AND DEVELOPMENT

N/A

BACKGROUND OF THE INVENTION

1. Field of the Invention

The instant invention relates generally to the field of LADAR (laser-radar) imaging technology. Specifically, the instant invention relates to a device which allows three-dimensional laser imaging of partially obscured or camouflaged targets with very high range resolution and sensitivity.

Current LADAR imaging typically comprises scanning a target with a laser and detecting the reflected photons, also referred to as a laser echo, with a photon detector such as a focal plane array. The time required for return of the laser echo from the target to the photon detector is calculated to determine the target range. The detector output signal is electronically processed to allow the definition of surface features on a three-dimensional object. Such imaging capability is valuable in situations where, for instance, a vehicle is camouflaged or obscured by foliage or in an urban environment when an imaging sensor can acquire only a limited or angular view of a target.

2. Description of the Related Art

In general, existing LADAR imaging systems include a laser source, appropriate optics in conjunction with a detector array, processing circuitry suitable for processing the detector array output into a usable form and post-processing circuitry and software capable of taking the processed detector array output and converting it into a usable format such as an image on an electronic display.

In the operation of such systems, one or more laser pulses are directed toward a desired target. The laser echoes from the target surface are received and imaged upon the detectors in a detector array using appropriate optics. Because the time of flight of the returning laser echoes will vary based on the distance between the detector array plane and the surface features from which the echoes are received, a three-dimensional image can be calculated based upon the relative echo delays.

Note that a laser echo delay of one nanosecond suggests a target surface variation of about 15 centimeters and that a laser echo delay of only 500 picoseconds translates into a target surface variation of about eight centimeters. As is evident from these short time periods, very high detector signal processing and timing circuit speeds are desirable in order to resolve target surface feature variations at a centimeter-level depth resolution. Unfortunately, existing LADAR imaging systems lack the necessary circuit speed and capacity to achieve very high (i.e., centimeter) range resolution and sensitivity.

Alternatively, conventional passive visible sensors, such as CCD video sensors, provide easily interpreted information to an observer. Nonetheless, these types of sensors are undesirable where accurate scene information in a complex video environment (i.e., camouflaged or partially obscured targets) is an important factor in the observer's decision-making.

Accordingly, a need exists for a LADAR imaging system that has the circuitry speed and density required to achieve range resolution and sensitivity necessary to define small target surface variations based on picosecond time of flight differences in laser echoes.

The instant invention addresses the aforementioned problems in prior art devices by providing a reliable, high speed, high circuit density LADAR detector system and device capable of providing range resolution and sensitivity at a centimeter level.

BRIEF SUMMARY OF THE INVENTION

One aspect of the present invention includes a photon source, such as a laser, beam shaping optics, a two-dimensional photo-detector array comprised of multiple photo-detector pixels, an optical lens for collecting reflected photons (laser echo) upon the detector array, a processing module comprised of stacked layers of readout electronics integrated circuit chips (ROIC), wherein each ROIC-containing layer has one or more channels, each channel containing circuitry for processing the detector array signals. In another aspect of the invention, external support circuitry is provided for the generating of a three-dimensional image on an electronic display from the output of the processing module.

The enhanced imaging capability provided by the claimed invention is achieved, in part, by the use of stacked layers containing the ROIC circuitry, which increases detector output processing circuit density while minimizing circuit lead length and associated capacitance. The result of the stacked layers of ROIC circuitry is the ability to integrate a large (e.g., 128×128 or larger) detector array with associated dedicated detector readout circuitry (amplifier, threshold detector, sampling circuitry, digital to analog converter (DAC) and first in, first out, (FIFO) register range bins all within a very small module.

The resultant module permits the circuit speeds and densities required to resolve small, three-dimensional target features based on one or more laser echoes sensed by each detector pixel on the detector array while simultaneously providing dedicated processing channels for each detector on the detector array.

The multilayer ROIC processing module is preferably comprised of a stack of layers containing thinned, integrated circuit chips, each layer including one or more receiver channels. Each channel comprises circuitry which detects the laser echo time from $T_0$ (the start of a laser pulse or a user-assigned $T_0$ point) to the time of laser echo return, based on the receipt of photons that are reflected from the imaged target surfaces. Laser echo time of flight information is pre-processed, and then converted to a digital bit stored in a FIFO register comprising a set of range bins on the ROIC. A high bit in a range bin may, for instance, be designated as indicating the time of arrival of a laser echo, based on its location within the set of range bins. The range bin data is multiplexed off of the ROIC module to external circuitry which, in turn, interprets the data and converts it to a usable form, such as a 3-D point cloud for representation as an electronic image on a display.

While the claimed apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

Figure 1:
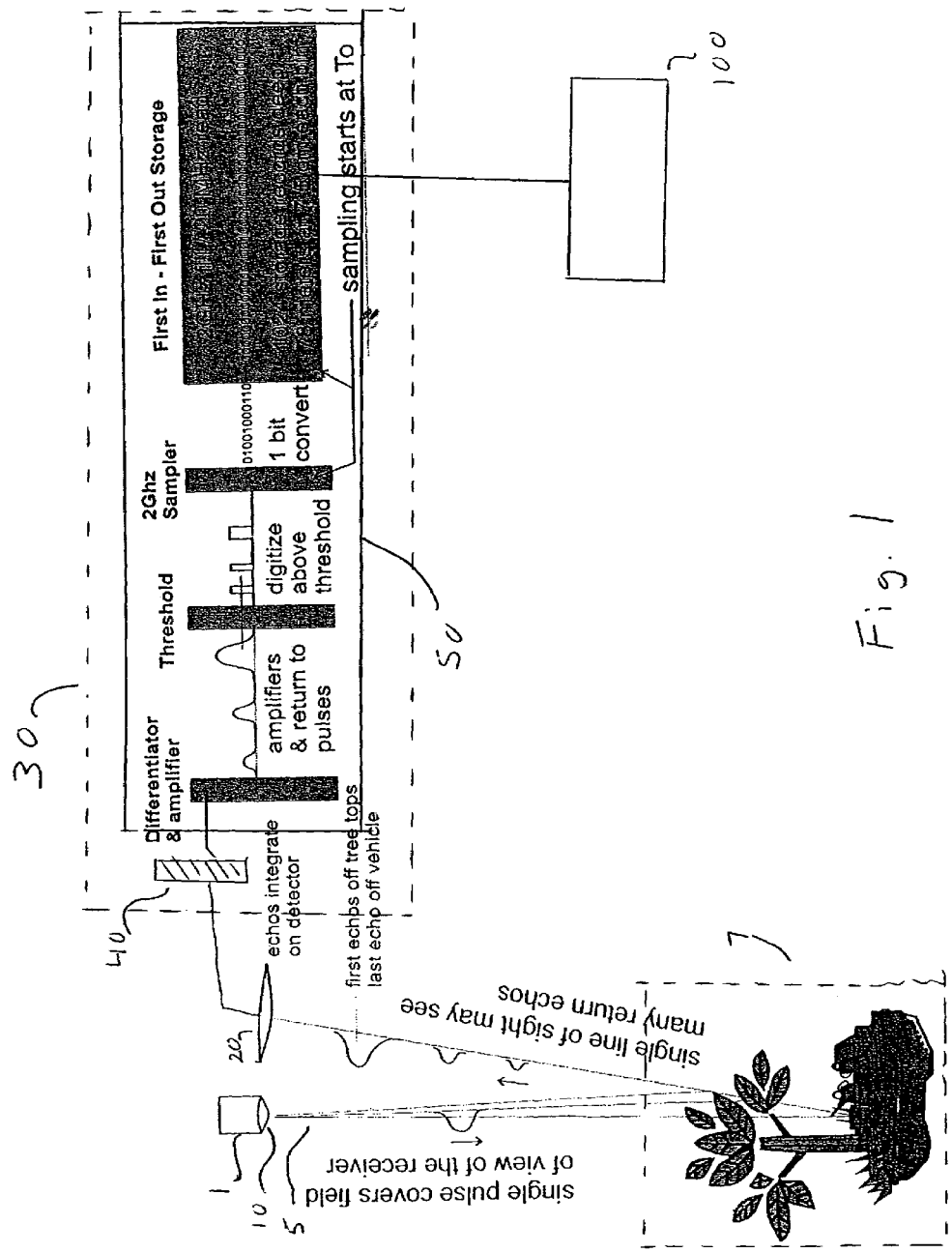
FIG. 1 is a block diagram of the present invention.

Turning now to the figures wherein like numerals designate like elements among the several views, FIG. 1 shows a block diagram of the present invention.

A photon source, such as a laser 1, generates a beam 5, which is directed toward a scene or target 7, through beam-shaping optics 10.

In a preferred embodiment, laser 1 is a 1064 nm, mechanically aligned, 300 micro-Joule, seed YAG laser capable of producing a pulse width of 500 picoseconds. In the preferred embodiment, a beam amplifier is provided (not shown), such as a master oscillator power amplifier wherein a seed beam is fed into the amplifier. In this preferred embodiment, the seed beam passes through a Faraday rotator and enters a four-pass, thermally controlled amplifier which includes two pumped YAG diodes.

In the preferred embodiment, beam-shaping optics 10 is a beam-shaping holographic lens suitable for projecting a rectangular beam area on a target. It has been determined that a rectangular beam area optimizes the ability of a detector array to receive and process reflected photons in its field of view.

Beam 5 is preferably amplified to generate a detectable photon reflection off of a target having 10% reflectivity at 100 meters.

Collection optics 20 are provided, preferably a 75-mm, F1.4 lens with an appropriate spectral filter for optimization of the laser pulse wavelength. Collection optics 20 are oriented so as to receive photons that are reflected from the imaged target 7, (i.e., the collective obscuration, subject and ground) and focus them upon the invention's detector array as is discussed below.

After beam amplification, beam 5 may optionally be pre-aligned with the invention's detector array by passing beam 5 through Risley prisms (not shown) to steer and rotate beam 5 for "bore sighting" to the invention's detector array.

It has been determined that placing beam-shaping optics 10 in close proximity and aligned with collection optics 20 minimizes parallax error with respect to the two optical subassemblies.

Further included is a detector assembly 30 comprising a sensor array or detector array 40 and a multilayer processing readout electronics module 50.

Detector array 40 is generally a focal plane array of individual photo-detectors suitable for detecting reflected photons from a target and generating a signal in response thereto. In the preferred embodiment, an InGaAs detector array is used. Irvine Sensors Corp., the assignee herein, has demonstrated a 128×128 InGaAs detector array with 40-micron active detectors on 50-micron centers in the disclosed invention, wherein a 128×8 set of detectors on the array were accessed.

Figure 2:
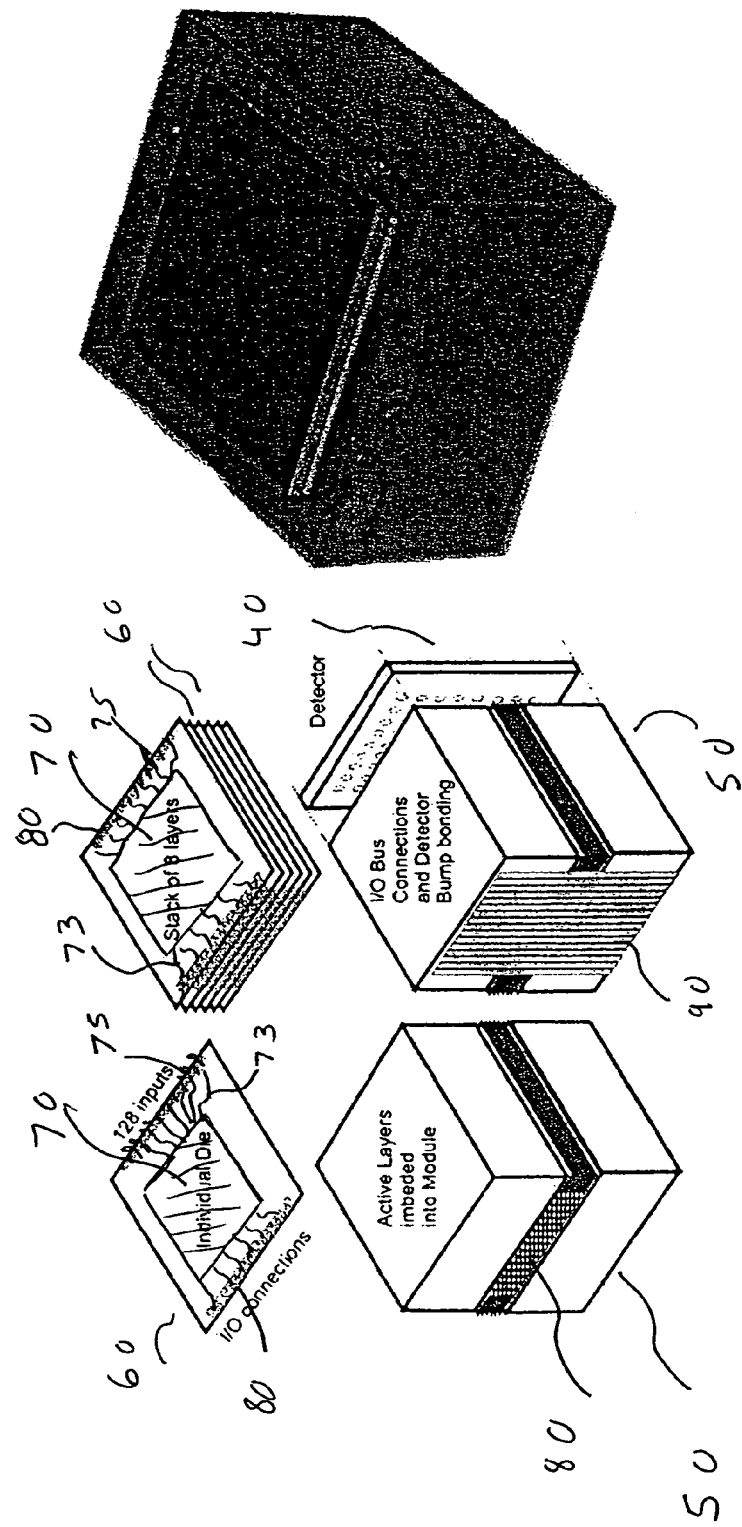
FIG. 2 is a perspective view of the individual layers and stacked configuration of the present invention
Figure 3:
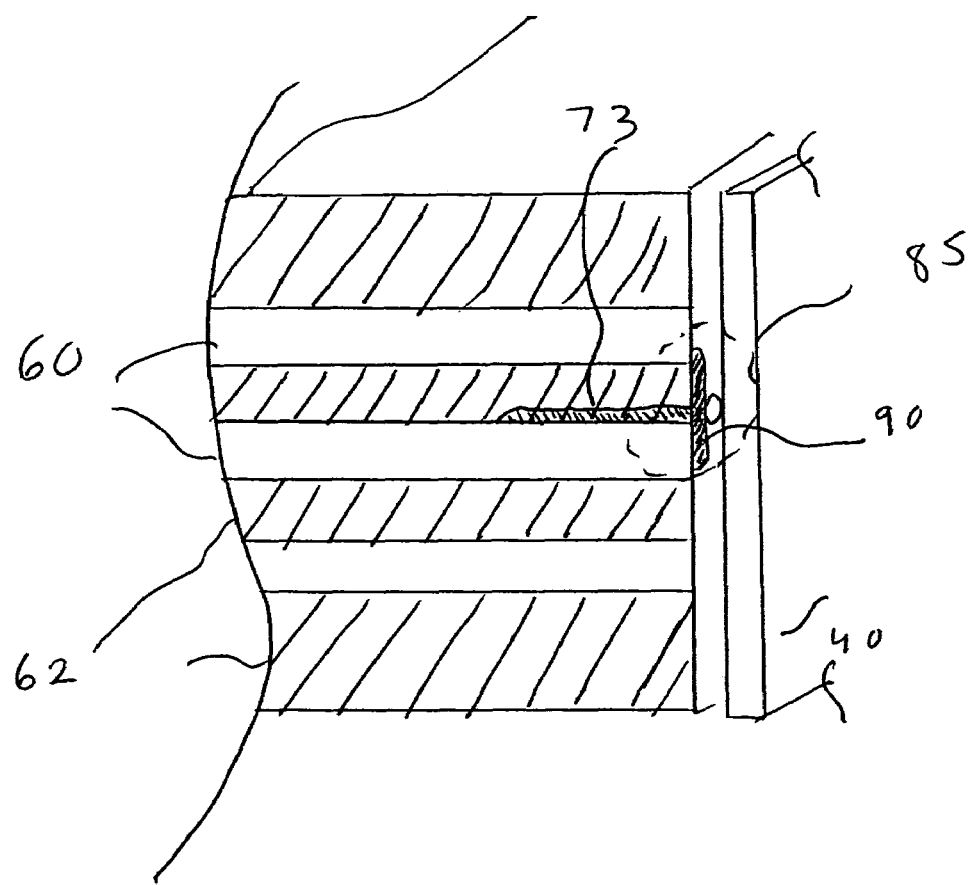
FIG. 3 is a cross section the processing module of the present invention showing an exemplar T-connect.

Turning now to FIGS. 2 and 3, processing module 50 includes a stack of two or more layers 60, each layer containing one or more readout electronics circuits 70, preferably in the form of integrated circuit chips, for the processing of signals received from detector array 40. Each readout electronic circuit 70 includes one or more channels 75 comprised of electronic circuitry for the processing of electronic signals from detector array 40.

Individual layers 60 are formed so that appropriate input, output, power and ground paths of read out electronic circuits 70 are routed using metalized traces 73 to one or more edges of each layer 60 to form one or more access leads 80.

Layers 60 are bonded together using an appropriate adhesive 62 as is known in the art and processed (e.g., ground or lapped) so as to expose access leads 80. Layers 60 may optionally be thinned using techniques that are well known in the field of semiconductor processing and packaging. Thinned active layers may be embedded silicon cap chips for ease of handling.

Suitable conductive interconnect pads 90 are formed on one or more lateral surfaces of processing module 50 to form one or more "T-connects" 85 to allow the electrical interconnection of access leads 80 to detector array 40 as well as to external image processing electronics.

FIG. 3 illustrates a detailed cross section of an exemplar T-connect 85 between a bump bond on a detector array 40 and a metalized access lead 80. The T-connect structures conveniently allow the interconnection of the high-density stack of layers to detector array 40 and external circuitry contained outside of the processing module.

The preferred embodiment provides interconnect pads 90 formed on one or more processor module lateral surfaces so as to allow the bump bonding of detector array 40, such as by indium bump bonding. After bump bonding of detector array 40, the volume occupied by perpendicularly disposed detector array 40 upon processor module 50 is minimized yet the detector-to-readout circuitry lead length is optimized to increase speed while reducing parasitic capacitance. Such an interconnection orientation takes full advantage of the high circuit density of the processing module while providing very short circuit paths necessary for high-speed laser range resolution.

Referring back to FIG. 1, external electronic circuitry 100 for receiving and processing the output of processor module 50 may be connected through the use of wirebonding to interconnect pads 90 formed on the accessible surfaces of processing module 50.

In system operation, beam 5 expands outward from beam-shaping optics 10 and is imaged upon the desired target. Photons from the pulsed beam which are not absorbed by the target or specularly reflected, return to collection optics 20 from the various target surfaces. Because the distance between the target surfaces and collection optics varies, so will the time the reflected photons are received by the detector assembly. Note that each individual detector in the detector array may witness multiple signal returns from photon reflections off of scene surfaces at different distances from the detector array.

Beam 5 is swept across the target area in a scan to attain 256 vertical samples. The laser is pulsed at 94 Hz to attain 256 horizontal samples while the channel data records in the 1024 FIFO range bins. The $256 \times 256 \times 10^{24}$ data is recorded as a frame and multiple frames registered and coalesced into a 3-D point cloud for display as a 3-D image for classification of target objects.

The time of flight for the reflected photons emitted from laser 1 to their return to the surface of detector array 40 will vary depending upon the distance of the target surfaces based upon the speed of light ($c=3\times10^8$ n/s) and the physical characteristics of the associated light conducting medium.

Figure 4:
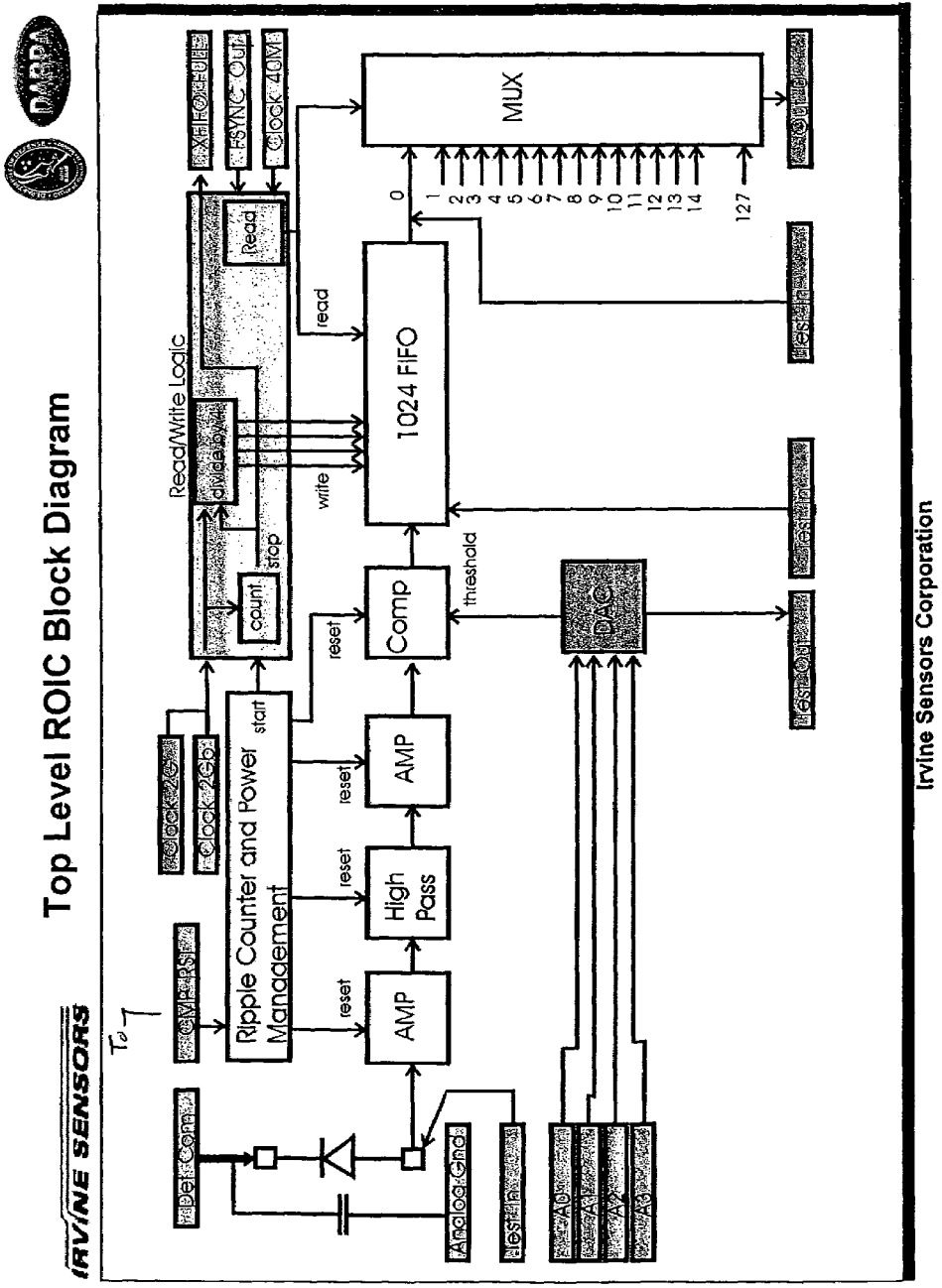
FIG. 4 is a circuit block diagram of the integrated circuit of the present invention.

An exemplar block diagram of a preferred embodiment of a channel on the ROIC chip is shown in FIG. 4. As illustrated in FIGS. 1 and 4, each channel 75 can function as a dedicated detector signal input circuit and includes circuitry that receives a $T_0$ trigger signal (initial laser pulse trigger) to provide the FIFO register with a reference for the time of the laser echo's arrival at detector array 40. The preferred laser pulse is short relative to the capture interval (e.g. −500 picoseconds vs. 500 nanoseconds) and multiple returns can be detected by a single detector pixel.

Each channel 75 is preferably comprised of an analog section that operates with a very high bandwidth. Each channel further comprises a digital section operating at up to 2 GHz during the time the FIFO register is filling with data. A digital to analog converter is included in channel 75 as well as circuitry to allow a user to adjust a comparator's threshold. Each ROIC can contain multiple channels (e.g., 128 channels) that may be multiplexed to a single output for image processing by external circuitry 100.

Received laser echoes are integrated and filtered by the channel during a capture interval. The integrated signals are then amplified and differentiated. This converts the signals back into pulses with amplified signal strength great enough to allow detection by the comparator. The comparator detects whether the pulses are above or below a programmable predetermined threshold. In a preferred embodiment, the comparator's output is sampled at a 2 GHz rate, resulting in a one bit, analog to digital converted signal.

In a preferred embodiment, each channel 75 includes a 1024 deep, FIFO register which stores the history of the comparator's output from $T_0$ to $T_0$ plus approximately 500 nanoseconds. A high bit in the FIFO register may be defined as representing the arrival time of a laser echo with respect to the $T_0$ signal, as determined by the bit's location in the register. With the FIFO clocking at 2 GHz, each stage of the register bin represents 500 picoseconds of time history, which in turn, equates to 7.5 cm of range history. The timing of the $T_0$ trigger signal can be varied to allow longer return times for laser echoes returning from more distant targets.

After the 1024 stages of FIFO are filled, the ROIC begins to read (MUX) the data out to external circuitry 100 using conventional frame and line signals at a 20 MHz rate. The MUX data may be processed using appropriate external circuitry so as to create a 3-D point cloud defined by the target and further processed to create a 3-D electronic image.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

What is claimed is:

1. A photon detector module comprising:
    a photon detector array comprising a plurality of photodetectors for detecting photons and generating output signals in response to photon detection; and
    a plurality of readout electronics integrated circuit chips, each readout electronics integrated circuit chip comprising a plurality of channels for receiving and processing the output signals generated by said photon detector array,
    wherein said plurality of readout electronics integrated circuit chips are arranged in a stacked configuration with each readout electronics integrated circuit chip forming one layer of the stacked configuration, and
    wherein said photon detector array is bonded to a lateral surface of the stacked configuration perpendicular to the stacked configuration and connected to the plurality of channels via a plurality of connections arranged on the lateral surface of the stacked configuration.

2. The photon detector module of claim 1, wherein said photon detector array is comprised of at least an 8×128 array of photo-detectors.

3. The photon detector module of claim 1, wherein said photon detector array is comprised of at least a 128×128 array of photo-detectors.

4. The photon detector module of claim 1, wherein said photon detector array is an InGaAs detector array.

5. The photon detector module of claim 1, wherein the plurality of connections arranged on the lateral surface of the stacked configuration are T-connects.

6. The photon detector module of claim 1, wherein said plurality of readout electronics integrated circuit chips are thinned.

7. The photon detector module of claim 1, wherein said plurality of readout electronics integrated circuit chips are bonded together in the stacked configuration with an adhesive.

8. The photon detector module of claim 1, wherein each of the plurality of channels comprises:
    amplifier circuitry for amplifying an output signal generated by said photon detector array;
    differentiator circuitry for differentiating the amplified output signal;
    comparator circuitry for comparing the differentiated output signal to a predetermined threshold;
    analog-to-digital conversion circuitry for converting the compared output signal to a digitized value; and
    a FIFO register for receiving and storing the digitized value.

9. The photon detector module of claim 8, wherein the digitized value is a one bit digital value.

10. The photon detector module of claim 8, wherein the predetermined threshold is programmable using external programming means.

11. The photon detector module of claim 8, wherein each readout electronics integrated circuit chip further comprises output means for outputting the digitized values stored in said FIFO registers of the plurality of channels.

12. The photon detector module of claim 11, wherein said output means comprises at least one multiplexing circuit.

* * * * *